United States Patent [19]

Wong

[11] Patent Number: 4,708,994

[45] Date of Patent: Nov. 24, 1987

[54] ENGINEERING THERMOPLASTICS CONTAINING PENDANT BENZOCYCLOBUTENE GROUPS

[75] Inventor: Pui K. Wong, Katy, Tex.

[73] Assignee: Shell Oil Company, Houston, Tex.

[21] Appl. No.: 880,260

[22] Filed: Jun. 30, 1986

[51] Int. Cl.[4] .......................................... C08F 283/08
[52] U.S. Cl. .................................... 525/392; 525/49; 525/289; 525/297; 525/390; 525/416; 525/420; 525/426; 525/471; 525/534; 525/535; 525/536; 525/437; 525/468; 525/275; 525/245; 525/261; 525/251; 525/244; 525/255; 526/281
[58] Field of Search ............... 526/281; 525/289, 297, 525/534, 535, 49, 468, 462, 390, 392, 471, 416, 426, 420, 536, 244

[56] References Cited

U.S. PATENT DOCUMENTS

| | | | |
|---|---|---|---|
| 2,917,499 | 12/1959 | Cripps et al. | 260/93.1 |
| 3,366,616 | 1/1963 | Tietz | 260/93.1 |
| 3,470,137 | 9/1969 | Blanchard, Jr. | 260/78.5 |
| 3,497,483 | 2/1970 | Ketley | 260/79.5 |
| 3,523,928 | 8/1970 | Blanchard, Jr. | 260/80 |
| 3,595,900 | 7/1971 | Loudas et al. | 260/453 |
| 4,540,763 | 9/1985 | Kirchhoff | 526/281 |
| 4,587,312 | 5/1986 | Hergenrother | 525/535 |
| 4,596,860 | 6/1986 | Percec et al. | 525/390 |
| 4,642,329 | 2/1987 | Kirchhoff | 526/284 |

OTHER PUBLICATIONS

Polymer 22, 1096 (1981).
Sci. Adv. Mater. Proc. Eng. Ser., 747 (1982).
J. Polym. Sci. Polym. Chem. Ed., 20, 3131 (1982).
J. Polym. Sci. Polym. Chem. Ed. 23, 2233–46, (1985).
J. Polym. Sci. Polym. Chem. Ed. 18, 495 (1980).
Polym. Prepr. 22(1), 25–6, (1981).
Research Disclosure 268008.
Boekelheide et al., Tetrahedron Lett. 1978, 4245–8.
Boekelheide, Topics in Current Chem. 1983, 113, 100–4.
Perkins et al., Angew. Chem. Int. Ed. Engl. 1978, 17(8), 615–6.
Ewing et al., J. Chem. Soc., Chem. Commun. 1979, 207.
Gray et al., J. Am Chem. Soc. 1978, 100, 2892–3.
Harruff et al., J. Am Chem. Soc. 1978, 100, 2893–4.
Aalbersberg, Tetrahedron Lett. 1979, 22, 1939–42.
Hubert et al., J. Chem. Soc. 1965, 3160.
DeCamp et al., Tetrahedron Lett. 1974, 40, 3575–8.
Tan et al., 1985 ACS Meeting, Chicago, Sep. 8–13, 1985, ACS Polymer Preprint 1985, 26(2), 178.
Arnold et al., 31st Int. SAMPE Symposium, Apr. 7–10, 1986, Preprint 1986, 968–976.
Tan et al., 1986 ACS Meeting, Apr. 13–18, 1986, ACS Polymer Prepint 1986, 27(1), 453–4.
Tan et al., 1985 ACS Meeting Chicago, Sep. 8–13, 1985, ACS Polymer Preprint 1985, (26)(2), 176.
Denny et al., ACS Meeting, Denver, Apr. 5–10, 1987, ACS Polymer Preprint 1987, 28(1), 656–9.
Tan et al., ACS Meeting, Denver, Apr. 5–10, 1987 ACS Polymer Preprint 1987, 28(1), 650–5.

Primary Examiner—Wilbert J. Briggs, Sr.
Assistant Examiner—David W. Woodward

[57] ABSTRACT

This invention describes the preparation of reactive engineering thermoplastics containing arylcyclobutene groups pendant to an aromatic ring. The polymers are prepared by alkylation or acylation of an engineering thermoplastic which contains one or more aromatic groups capable of being alkylated or acylated with a suitable arylcyclobutene alkylating or acylating agent. The prepared reactive engineering thermoplastics containing pendant arylcyclobutene groups may be cross-linked and cured by heating above about 200° C.

19 Claims, No Drawings

ENGINEERING THERMOPLASTICS CONTAINING PENDANT BENZOCYCLOBUTENE GROUPS

FIELD OF THE INVENTION

The invention relates broadly to novel polyaryl engineering thermoplastics which contain arylcyclobutene groups pendant to an aromatic ring of the thermoplastic and a method for their preparation. In particular, the invention relates to polyaryl engineering thermoplastics containing benzocyclobutene groups pendant to an aromatic ring of the thermoplastic and a method for their preparation.

BACKGROUND OF THE INVENTION

Engineering thermoplastics are a group of polymers that possess a balance of properties comprising strength, stiffness, impact resistance, and long term dimensional stability that make them useful as structural materials. Engineering thermoplastics are especially attractive in replacing metals as a viable means of reducing weight in automotive and aircraft applications, thereby increasing the fuel efficiency and payload.

Despite the attractive mechanical properties offered by engineering thermoplastics, many thermoplastics are unacceptable as structural resins where resistance to solvents is an absolute requirement. Materials such as polysulfones, undergo solvent induced cracking and crazing, especially under stress, with the loss of mechanical integrity. In addition, thermoplastics typically undergo creep under load at elevated temperatures which precludes their use in applications where high temperature dimensional stability is necessary.

Prior work has been performed in an attempt to overcome the disadvantages of engineering thermoplastics while maintaining the attractive features. For example, crystallinity has been employed to gain solvent resistance with a commercial polyetheretherketone (PEEK) as reported in Polymer, 22, 1096 (1981) and Sci,. Adv. Mater. Proc. Eng. Ser., 747 (1982). J. Polym. Sci. Polym. Chem. Ed., 20, 3131 (1982) reports the successful end capping of polysulfones with ethynyl groups, followed by crosslinking, to improve solvent resistance and U.S. Pat. No. 3,595,900 discloses a method to prepare cyanato-terminated polyarylene ethers which can be thermally crosslinked to give improved flexibility and resistance to thermal degradation.

Instead of placing reactive groups on the ends of molecules, an alternate approach to improve properties has been to incorporate reactive pendant groups along the polymer backbone. This approach gives a more effective means of crosslinking thermoplastics to improve solvent resistance while retaining good toughness and thermoformability. An example of this approach was the incorporation of pendant ethynyl groups in sulfone/ester polymers as reported in the J. Polym. Sci. Polym. Chem. Ed. 23, 2233-46, (1985) and U.S. Pat. No. 4,587,312. Pendant ethynyl and phenylethynyl groups have also been incorporated in other thermoplastics, such as polyamides and polyurethanes as reported in J. Polym. Sci. Polym. Chem. Ed. 18, 495 (1980) and Polym. Prepr. 22(1), 25-6 (1981).

The present investigation has shown a process to incorporate pendant arylcyclobutene groups in a polyaryl engineering thermoplastic to give new polymeric structures with improved properties and advantages in curing. U.S. Pat. No. 4,540,763 discloses polymeric compositions prepared by exposing poly(arylcyclobutenes) to temperatures at which the poly(arylcyclobutenes) undergo polymerization. However, the patent does not disclose the process of the present invention for preparing polyarylcyclobutenes nor the novel compositions of that process.

The present investigation has shown that pendant arylcyclobutene groups may be incorporated in a polyaryl engineering thermoplastic to give new polymeric structures with improved properties and advantages in curing.

SUMMARY OF THE INVENTION

This invention is concerned with a polymeric composition which comprises a polyaryl having arylcyclobutene groups pendant to an aromatic ring of said polyaryl, the polyaryl selected from the group consisting of poly(aryl ether ketones), poly(aryl ether sulfones), poly(aryl ethers), poly(phenylene oxides), polyarylenes, polyphenylenes, polyxylylenes, polyarylacetylenes, poly(aryl sulfides), poly(aryl esters), poly(aryl carbonates) poly(aryl amides), poly(aryl ester carbonates), poly(aryl amide imides), poly(aryl ether imides), and poly(aryl ether sulfone imides).

The invention also relates to a process for preparing a polyaryl engineering thermoplastic having arylcyclobutene groups pendant to an aromatic ring of the thermoplastic. The process comprises reacting a polymer selected from the group consisting of poly(aryl ether ketones), poly(aryl ether sulfones), poly(aryl ethers), poly(phenylene oxide), polyarylenes, polyphenylenes, polyxylylenes, polyarylacetylenes and poly(aryl sulfides), poly(aryl esters), poly(aryl carbonates), poly(aryl amides), poly(aryl ester carbonates), poly(aryl amide imides), poly(aryl ether imides), and poly(aryl ether sulfone imides) in a suitable inert liquid reaction medium with an effective amount of an arylcyclobutene of the formula:

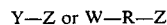

Y—Z or W—R—Z wherein Y is selected from the group consisting of CN, $H_2C=C(H)$, $CO_2R'$, $R'CO_2$, CHO, $COR'$, $CO_2OCR'$, $CO_2H$, and COX, wherein W is selected from the group consisting of a halogen, OH, SCN, SCl, CN, $H_2C=C(H)$, $CO_2R'$, $R'CO_2$, CHO, $COR'$, $CO_2OCR'$, $CO_2H$, and COX, where X is a halogen and R' is an hydrocarbyl group, wherein R is a hydrocarbylene group and R contains an alkylene group bonded to W when W is a halogen, OH, SCN or SCl, wherein Z is an arylcyclobutene group and Y and R are bonded to the aryl group of Z, and with a catalytic amount of a Lewis acid catalyst, and heating the reaction medium at a temperature below the temperature at which the arylcyclobutene alkylating or acylating agent undergoes polymerization or dimerization.

The invention further relates to a cured composition obtained by heating the polymeric composition comprising the polyaryl engineering thermoplastic containing arylcyclobutene groups pendant to an aromatic ring of the thermoplastic to a temperature at which arylcyclobutenes undergo polymerization or dimerization to obtain the desired crosslinking.

DETAILED DESCRIPTION OF THE INVENTION

The products of the process of the instant invention are polyaryl engineering thermoplastics having arylcyclobutene groups pendant to an aromatic group that is preferably, although not essentially in the backbone of the polymer. Such novel polyaryl engineering thermoplastics possess a unique approach to curing or crosslinking. Upon heating to a sufficient temperature, arylcyclobutenes undergo ring opening to produce o-quinodimethane structures. Thermoplastics containing arylcyclobutenes may be crosslinked via homopolymerization or dimerization of the thermally generated o-quinodimethane structures. Curing or crosslinking only occurs when the thermoplastics containing the pendant arylcyclobutene groups are heated to a temperature that produces ring opening of the arylcyclobutene structure. Such a thermally induced curing or crosslinking approach offers the potential advantages of (1) long shelf-life for the resin, (2) no evolution of volatiles during curing, (3) catalyst-free curing or crosslinking, and (4) improved properties of solvent resistance and higher Tg.

A number of polyaryl engineering thermoplastics may be chosen. The label engineering thermoplastic has come to be applied to those polymers that possess a property balance comprising strength, stiffness, impact, and long term dimensional stability. Preferably these engineering thermoplastics have glass transition temperatures or apparent crystalline melting points (defined as that temperature at which the modulus, at low stress, shows a catastrophic drop) of over about 120° C., more preferably between about 150° C. and about 350° C., and are capable of forming a continuous network structure through a thermally reversible crosslinking mechanism. Such thermally reversible crosslinking mechanisms include crystallites, polar aggregations, ionic aggregations, lamellae, or hydrogen bonding. The upper limit (350° C.) on apparent crystalline melting point or glass transition temperature is set so that the resin may be processed in low to medium shear rate equipment at commercial temperature levels of 350° C. or less.

The particular aromatic polymer that may be alkylated or acylated in the process of the present invention can be any one of many polyaryl engineering thermoplastics which have an aromatic moiety, preferably, although not essentially in the backbone of the polymer. It is required that the aromatic moiety of the thermoplastic have at least one directly bonded hydrogen for purposes of attachment when reacting with the arylcyclobutene alkylating or acylating agent. The aromatic group of the thermoplastic to be alkylated or acylated may be non-substituted or substituted. Such substituents must be stable to the alkylation or acylation conditions employed in the process of the invention and not subject to side reactions with the alkylating or acylating agent or the thermoplastic. Typical substituents may be electron withdrawing or electron donating groups. Examples of such substituents include but are not limited to, lower alkyl, e.g. methyl, ethyl, butyl; aryl, e.g. phenyl, tolyl; halo, e.g. chloro, bromo, iodo; and lower alkoxy, e.g. methoxy, ethoxy. Preferred embodiments employ those polyaryl thermoplastics which have aromatic moieties that are non-substituted.

Included among such polymers may be mentioned, for instance, poly(aryl ethers) and poly(aryl ether sulfones). The poly(aryl ethers) envisioned in the present invention include the linear thermoplastic polymers composed of recurring units having the formula

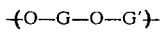     I wherein G is the residuum of a dihydric phenol selected from the group consisting of

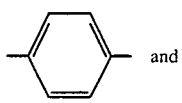     II

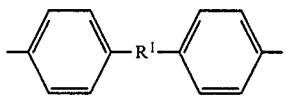     III wherein $R^1$ represents a bond between aromatic carbon atoms, —O—, —S—, —S—S—, or divalent hydrocarbon radical having from 1 to 18 carbon atoms inclusive, and G' is the residuum of a dibromo or diiodobenzenoid compound selected from the group consisting of

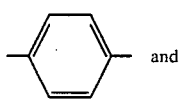     IV

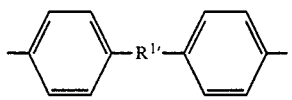     V wherein $R^{1'}$, represents a bond between aromatic carbon atoms, —O—, —S—, —S—S—, or a divalent hydrocarbon radical having 1 to 18 carbon atoms inclusive, with the provisions that when $R^1$ is —O—, $R^{1'}$ is other than —O—; when $R^{1'}$ is —O—, $R^1$ is other than —O—; when G is II, G' is V, and when G' is IV, G is III. Polyarylene polyethers of this type exhibit excellent physical properties as well as excellent thermal oxidative and chemical stability. These poly(aryl polyethers) can be produced by the method disclosed in U.S. Pat. No. 3,332,909. Commercial poly(aryl polyethers) can be obtained from Uniroyal Chemical Division under the tradename ARYLON T ® Polyaryl ethers, having a melt temperature of between about 280° and 310° C.

Another group of useful engineering thermoplastics include aromatic poly(sulfones) and poly(ether sulfones). Poly(sulfones) comprising repeating units of the formula

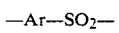

in which Ar is a bivalent aromatic radical and may vary from unit to unit in the polymer chain (so as to form copolymers of various kinds), may be deactivated to the process of the present invention or may require more vigorous reactions conditions to achieve the alkylation of the present invention. Therefore, it is much preferred in the present invention to employ thermoplastic poly(sulfones) which generally have units of the structure

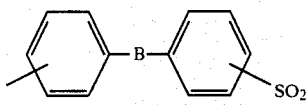

in which B is oxygen or sulfur or the residue of an aromatic diol such as 4,4'-bisphenol. One example of such a poly(sulfone) has repeating units of the formula

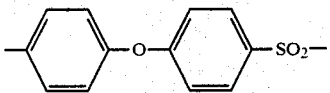

another has repeating units of the formula

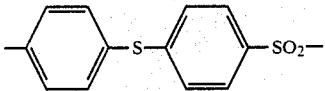

and others have repeating units of the formula

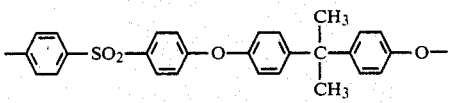

or copolymerized units in various proportions of the formula

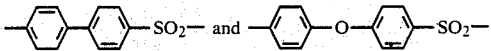

The thermoplastic poly(ether sulfones) may also have repeating units having the formula

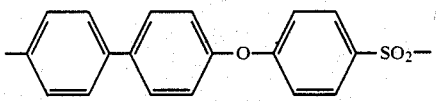

These aromatic poly(sulfones) and their method of preparation are disclosed in the various patent references cited in the first column of U.S. Pat. No. 3,729,527.

Poly(ether sulfones) having repeating units of the following structure

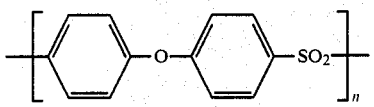

can be prepared by the method disclosed in U.S. Pat. No. 3,634,355; and are available from ICI United States Inc. as grades 200P and 300P. ICI grade 200P has a glass transition temperature of about 230° C.

Poly(ether sulfones) having repeating units of the following structure

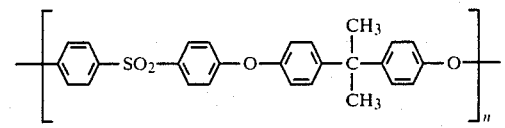

are available from Union Carbide as UDEL® polysulfone resin. In a preferred embodiment of the invention, UDEL is employed as the polyaryl thermoplastic.

Poly(phenylene oxides) and poly(phenylene sulfides) are also useful in the process of the present invention. The poly(phenylene oxides) and poly(phenylene sulfides) which may be included are represented by the following formulae

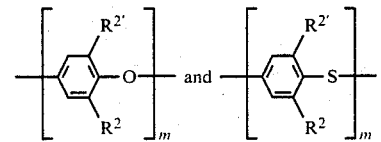

wherein $R^2$ is a monovalent substituent selected from the group consisting of hydrogen, hydrocarbon radicals free of a tertiary alpha-carbon atom, halohydrocarbon radicals having at least two carbon atoms between the halogen atom and phenol nucleus and being free of a tertiary alpha-carbon atom, hydrocarbonoxy radicals free of aliphatic, tertiary alpha-carbon atoms, and halohydrocarbonoxy radicals having at least two carbon atoms between the halogen atom and the phenol nucleus and being free of an aliphatic, tertiary alpha-carbon atom; $R^{2'}$ is the same as $R^2$ and may additionally be a halogen; m is an integer equal to at least 50, e.g. from 50 to 800 and preferably 150 to 300. Included among these preferred polymers are polymers having a molecular weight in the range between 6,000 and 100,000 preferably about 40,000. Preferably, the poly(phenylene oxide) is poly(2,6-dimethyl-1,4-phenylene)oxide. These poly(phenylene oxides) are described, for example in U.S. Pat. Nos. 3,306,874; 3,306,875; and 3,639,508.

Commercially, the poly(phenylene oxide) is available as a blend with styrene resin. See U.S. Pat. Nos. 3,383,435 and 3,663,654. These blends typically comprise between about 25 and 50% by weight polystyrene units, and are available from General Electric Company under the tradename NORYL® thermoplastic resin. The preferred molecular weight when employing a poly(phenylene oxide)/polystyrene blend is between about 10,000 and about 50,000, preferably around 30,000.

Thermoplastic poly(aryl esters) may also be employed in the instant invention. One particularly useful group of poly(aryl esters) are those thermoplastic polyesters prepared by condensing an aromatic dicarboxylic acid or the lower alkyl ester of such an acid, the acid halide, or an anhydride derivative of such an acid with a glycol, according to methods well-known in the art. Another useful group of poly(aryl esters) are those thermoplastic polyesters prepared by condensing an aliphatic dicarboxylic acid, or the lower alkyl ester of such an acid, the acid halide, or an anhydride derivative of such an acid with an aromatic glycol. Dicarboxylic acids having one aromatic carboxylic acid group and one aliphatic carboxylic acid groups may be used and mixtures of dicarboxylic acids may be used. Lower alkyl esters, acid halides, or anhydride derivatives of such dicarboxylic acids may also used. Aliphatic dicarboxylic acids that contain an aromatic group may be used and aromatic carboxylic acids that contain a hydroxy group may also be used.

Among the aromatic and aliphatic dicarboxylic acids suitable for preparing polyesters useful in the present invention are oxalic acid, malonic acid, succinic acid, glutaric acid, adipic acid, suberic acid, azelaic acid, sebacic acid, terephthalic acid, isophthalic acid, p-carboxyphenoacetic acid, p,p'-dicarboxydiphenylsulfone, p-carboxyphenoxyacetic acid, p-carboxyphenoxypropionic acid, p-carboxyphenoxybutyric acid, p-carboxyphenoxyvaleric acid, p-carboxyphenoxyhexanoic acid, p,p'-dicarboxydiphenylmethane, p,p'-dicarboxydiphenylpropane, p,p'-dicarboxydiphenyloctane, 3-alkyl-4-(β-carboxyethoxy)benzoic acid, 2,6-naphthalene dicarboxylic acid, 2,7-naphthalene dicarboxylic acid, and the like. Terephthalic acid is particularly preferred. Mixtures of dicarboxylic acids may also be employed.

The glycols suitable for preparing the polyesters useful in the present invention include straight chain alkylene glycols of 2 to 12 carbon atoms such as ethylene glycol, 1,3-propylene glycol, 1,6-hexylene glycol, 1,10-decamethylene glycol, 1,12-dodecamethylene glycol and the like. Another suitable glycol is 1,4-cyclohexane dimethanol. Much preferred glycols are the straight chain alkylene glycols having 2 to 4 carbon atoms. Aromatic glycols can be substituted in whole or in part. Suitable aromatic dihydroxy compounds include p-xylylene glycol, pyrocatechol, resorcinol, hydroquinone, or alkyl-substituted derivatives of these compounds.

A preferred group of polyesters are poly(ethylene terephthalate), poly(propylene terephthalate), and poly(butylene terephthalate). A much preferred polyester is poly(butylene terephthalate). Poly(butylene terephthalate), a crystalline copolymer, may be formed by the polycondensation of 1,4-butanediol and dimethylterephthalate or terephthalic acid, and has the the generalized formula:

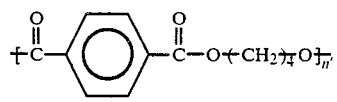

where n' varies from 70 to 140. The molecular weight of the poly(butylene terephthalate) typically varies from about 20,000 to about 25,000. A suitable process for manufacturing the polymer is disclosed in British Pat. No. 1,305,130. Poly(butylene terephthalate) is commercially available from General Electric under the tradename VALOX ® thermoplastic polyester.

Another preferred polyester is the commercial polyarylate ARDEL ® available from Amoco, having repeating units of the formulae

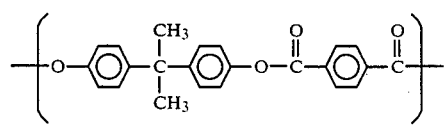

and

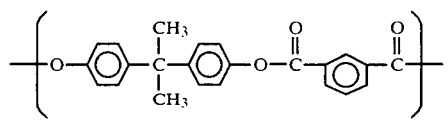

Other commercial polymers include CELANEX ® from Celanese, TEXNITE ® from Eastman Kodak, and VITUF ® from Goodyear Chemical.

Other polyesters useful in the invention also include thermotropic liquid crystalline polyesters. Thermotropic liquid crystalline polyesters may be prepared from molecules with formulae such as

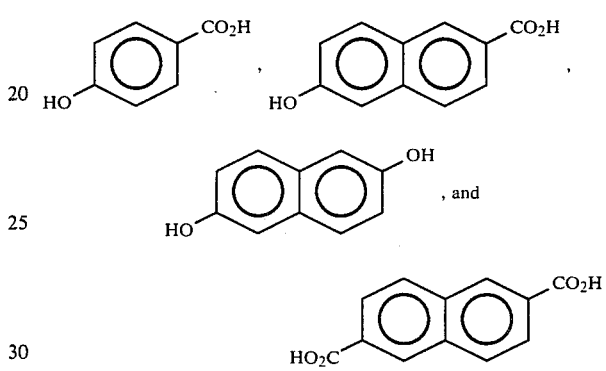

The poly(aryl carbonates) useful in this invention are of the general formulae

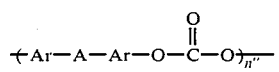

and

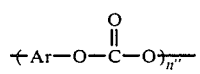

wherein Ar is selected from the group consisting of phenylene and alkyl, alkoxyl, halogen and nitro-substituted phenylene; A is selected from the group consisting of carbon-to-carbon bonds, alkylidene, cycloalkylidene, alkylene, cycloalkylene, azo, imino, sulfur, oxygen, sulfoxide and sulfone, and n" is at least two.

The preparation of the polycarbonates is well known and the details of the preparation need not be delineated here. There are a variety of preparative procedures set forth in *Chemistry and Physics of Polycarbonates* by Herman Schnell, Interscience Division of John Wiley & Co., New York (1964), first edition, as well as in British Pat. No. 772,627 and U.S. Pat. No. 3,028,365. In general, a preferred reaction is carried out by dissolving the dihydroxy component in a base such as pyridine and bubbling phosgene into the stirred solution at the desired rate. Tertiary amines may be used to catalyze the reaction as well as to act as acid acceptors throughout the reaction. Since the reaction is normally exothermic, the rate of phosgene addition can be used to control the reaction temperature. The reactions generally utilize equimolar amounts of phosgene and dihydroxy reactants, however, the molar ratios can be varied depending upon the reaction conditions.

The preferred polycarbonate utilized in this invention is obtained when Ar is p-phenylene and A is isopropylidene. This polycarbonate is prepared by reacting p,p'-isopropylidenediphenol with phosgene and is sold by General Electric Company under the trademark LEXAN ® and by Mobay under the trademark MERLON ®. This commercial polycarbonate typically has a molecular weight of around 18,000 and a melt temperature of over 230° C. Other polycarbonates may be prepared by reacting other dihydroxy compounds or mixtures of dihydroxy compounds, with phosgene. The dihydroxy compounds may include aliphatic dihydroxy compounds although for best high temperature properties aromatic rings are essential. The dihydroxy compounds may include within the structure diurethane linkages. Also, part of the structure may be replaced by siloxane linkage. These and other variations of poly(aryl carbonate) structure are described in the Schnell reference cited above. The same reference presents a long list of monomers (particularly dihydroxy compounds) that may be used in polycarbonate synthesis.

Poly(aryl amide) polymers are also useful in the present invention. By poly(aryl amide) is meant a condensation product which contains recurring aromatic amide groups as integral parts of the main polymer chain, such products being part of the group referred to generically as "nylons".

Poly(aryl amide) polymers may be obtained by polymerizing an aromatic monoaminomonocarboxylic acid or an integral lactam of such an acid having at least two carbon atoms between the amino and carboxylic acid groups; or by polymerizing substantially equimolar proportions of an aromatic diamine which contains at least two carbon atoms between the amino groups and a dicarboxylic acid; or by polymerizing substantially equimolar proportions of a diamine which contains at least two carbon atoms between the amino groups and an aromatic dicarboxylic acid; or by polymerizing a monoaminocarboxylic acid or an internal lactam of such an acid together with substantially equimolar proportions of a diamine and a dicarboxylic acid, where at least one of the three components is aromatic in character (e.g. an aromatic monoaminocarboxylic acid, or an aromatic diamine, or an aromatic dicarboxylic acid). The dicarboxylic acid may also be in the form of a functional derivative, for example an ester. The term "substantially equimolecular proportions" (of the diamine and of the dicarboxylic acid) is used to cover both strict equimolar proportions and the slight departures therefrom which are involved in conventional techniques for stabilizing the viscosity of the resulting polyamides. The average molecular weights of the polyamides used in the invention are generally above about 10,000.

Examples of the monoaminomonocarboxylic acids or lactams of said acids include compounds from 2 to 16 carbon atoms between the amino and carboxylic acid groups, the carbon atoms forming a ring with the —CO.NH— group in the case of a lactam. Particular examples of aminocarboxylic acids and lactams include 3- and 4-amino benzoic acids, ε-aminocaproic acid, butyrolactam, pivalolactam, caprolactam, capryl-lactam, enantholactam, undecanolactam and dodecanolactam.

Examples of the diamines are aromatic diamines, e.g. p-phenylenediamine, 4,4'-diaminodiphenyl sulphone, 4,4'-diaminodiphenyl ether and 4,4'-diaminodiphenylmethanediamines. Other examples include aliphatic diamines that contain aromatic moieties such as xylylenediamine and diamines of the general formula $H_2N(CH_2)_nNH_2$, where n is an integer of from 2 to 16, such as trimethylenediamine, tetramethylenediamine, pentamethylenediamine, octamethylenediamine, decamethylenediamine, dodecamethylenediamine, hexadecamethylenediamine, and especially hexamethylenediamine.

C-alkylated diamines, e.g. 2,2-dimethylpentamethylenediamine and 2,2,4- and 2,4,4-trimethylhxamethylenediamine are further examples as are cycloaliphatic diamines, for example diaminodicyclohexylmethane.

The preferred dicarboxylic acids are aromatic, for example isophthalic and terephthalic acids. Other aliphatic dicarboxylic acids that may be used are of the general formula HOOC.Y.COOH where Y represents a divalent a divalent aliphatic radical containing at least 2 carbon atoms. Examples of such acids are oxalic acid, sebacic acid octadecanedioic acid, suberic acid, azelaic acid, undecanedioic acid, glutaric acid, pimelic acid, and especially adipic acid.

Specifically the polyamides polyhexamethylene isophthalamide (nylon 6:iP), polymetaxylylene adipamide (nylon MXD:6), and nylon 6:3 produced by Dynamit Nobel may be useful in the process of the invention. Nylon 6:3 is the product of the dimethyl ester of terephthalic acid and a mixture of isomeric trimethyl hexamethylenediamine. Two aromatic polyamides are available commercially from Du Pont under the tradenames NOMEX ® which has the general formula

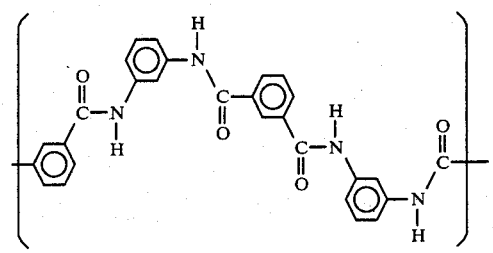

and KEVLAR ® which has the formula

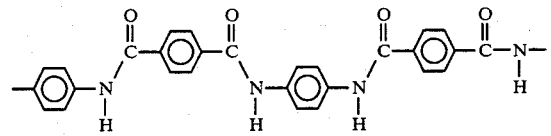

Nylon copolymers may also be used, for example copolymers of hexamethylene adipamide/hexamethylene-isophthalamide (nylon 6:6ip), and hexamethylene adipamide/hexamethylene-terephthalamide (nylon 6:6/6T).

Other polymers which are useful in the present invention include polyarylenes, polyphenylenes, polyxylylenes, polyarylacetylenes, polyaryl sulfides and polyimides. Useful polyimides are those with structures similar to

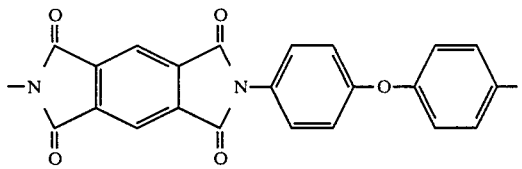

[See U.S. Pat. Nos. 3,179,633 and 3,179,634.] The polyetherimide of the formula

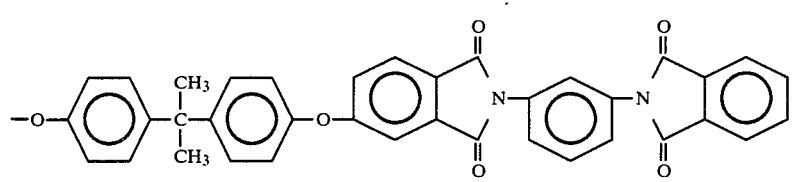

is commercially available from General Electric under the trade name ULTEM ® thermoplastic resin.

In addition, blends of various polyaryl engineering thermoplastics may also used in the invention, although it is noted that different levels of alkylation will be achieved for each thermoplastic in the blend under the conditions of the particular reaction.

Among the acrylcyclobutene alkylating and acylating agents that can be used the process of the present invention are, for example, 4-chloromethylbenzocyclobutane, 4-vinylbenzocyclobutene, 4-(3-butenyl)benzocyclobutene, 4-hydroxymethylbenzocyclobutene, and 4-carboxymethylbenzocyclobutene. The more preferred agent is 4-chloromethylbenzocyclobutene. Other alkylating and acylating agents that are useful in the process of the present invention include arylcyclobutenes of the formula:

Y—Z or W—R—Z wherein Y is selected from the group consisting of CN, $H_2C=C(H)$, $CO_2R'$, $R'CO_2$, CHO, COR', $CO_2OCR'$, $CO_2H$, and COX, and where Y is bonded to the aryl group of the arylcyclobutene group Z. W is selected from the group consisting of a halogen, OH, SCN, SCl, CN, $H_2C=C(H)$, $CO_2R'$, $R'CO_2$, CHO, COR', $CO_2OCR'$, $CO_2H$, and COX, where X is a halogen and R' is an hydrocarbyl group. Hydrocarbyl is defined here as a substituted or unsubstituted, saturated or unsaturated organic radical containing carbon and hydrogen atoms. The hydrocarbyl group may be aliphatic, meaning straight or branched hydrocarbon chains, or cycloaliphatic, such as cycloalkyl or cycloalkenyl. The hydrocarbyl group may also be aromatic.

Examples of suitable hydrocarbyls include the hydrocarbon radicals alkyl, alkenyl, alkynyl, and aryl. Aryl refers here to any aromatic radicals. Alkyl-, alkenyl-, and alkynyl-substituted aromatic radicals or aromatic-substituted alkyl, alkenyl and alkynyl radicals are also suitable. Other suitable hydrocarbyls and hydrocarbyl substituents may contain heteroatoms such as oxygen, nitrogen, sulfur or phosphorus, where such hydrocarbyls and substituents are stable to the alkylation or acylation conditions employed in the process of the invention and not subject to side reactions with the alkylating or acylating agent, or the thermoplastic. The preferred hydrocarbyls are unsubstituted organic radicals consisting of carbon and hydrogen atoms. More preferred hydrocarbyls are unbranched alkyl radicals such as methyl and ethyl.

R in the formula W—R—Z is a hydrocarbylene group bonded to the aryl group of the arylcyclobutene group Z and R contains an alkylene group bonded to W when W is a halogen, OH, SCN, or SCl. Hydrocarbylene is defined here as a substituted or unsubstituted, divalent organic radical containing carbon and hydrogen atoms. The hydrocarbylene group may be aliphatic, meaning straight or branched hydrocarbon chains, or cycloaliphatic, such as a cycloalkylene or a cycloalkylene. The hydrocarbon chains may be saturated or unsaturated. The hydrocarbylene group may also be aromatic.

Suitable hydrocarbylenes include divalent hydrocarbon radicals such as alkylene, alkenylene, alkynylene, arylene, and combinations of these radicals. Arylene refers here to any divalent aromatic radical. Alkyl- or alkenyl-substituted aromatic radicals or aromatic-substituted alkylenes or alkenylenes are also suitable. Other suitable hydrocarbylenes and hydrocarbylene substituents may contain heteroatoms such as oxygen, nitrogen, sulfur or phosphorus, where such hydrocarbylenes and substituents are stable to the alkylation or acylation conditions employed in the process of the invention and not subject to side reactions with the alkylating or acylating agent, or the thermoplastic. The preferred hydrocarbylenes are unsubstituted organic radicals consisting of carbon and hydrogen atoms. More preferred hydrocarbylenes are unbranched divalent alkylenes such as methylene and ethylene. A preferred group for W is a halogen and a more preferred group is a chlorine. A preferred hydrocarbylene for R is a methylene and a preferred formula for W—R— is $Cl-CH_2-$.

Z in the formulas Y—Z and W—R—Z may be any arylcyclobutene group. An arylcyclobutene refers here to an aryl group which contains one or more cyclobutene rings fused to an aromatic ring. An aryl group refers to any aromatic moiety as defined previously. Preferred aromatic moieties include benzene, naphthalane, phenanthrene, anthracene, biaryl moieties or two or more aromatic moieties joined by an alkyl or cycloalkyl group. Examples of 2 or more joined aromatic moieties are diphenyl alkanes, and diphenyl cycloalkanes. Benzene is the most preferred aromatic moiety.

For the arylcyclobutene group Z, the aromatic moiety and cyclobutene ring may be non-substituted or substituted with a wide variety of substituents. For use as an alkylating or acylating agent in the instant invention, however, such substituents must be stable to the alkylation or acylation conditions employed and not subject to side reactions with the alkylating or acylating agent or the thermoplastic. Examples of such substituents include but are not limited to, lower alkyl, e.g. methyl, ethyl, butyl; aryl, e.g., phenyl, tolyl; halo, eg.g chloro, bromo, iodo; cyano; and lower alkoxy, e.g., methoxy, ethoxy. It is noted that substitution of the cyclobutene ring may affect the temperature at which the arylcyclobutene will undergo ring opening to give o-quinodimethane structures. Substitution of the cyclobutene ring generally lowers the temperature at which ring opening occurs. When the cyclobutene ring is non-substituted, the ring opening does not occur until temperatures of about 200° C. are achieved.

Preferred embodiments of the arylcylobutene group Z include 1-cyanobenzocyclobutene, 2,3-naphthocyclobutene, and 1,2-naphthocyclobutene. The more preferred embodiment is the arylcyclobutene with a non-substituted cyclobutene ring and a non-substituted aromatic moiety. The most preferred embodiment of arylcyclobutene group Z is benzocyclobutene.

The process for preparing the polyaryl engineering thermoplastic containing pendant arylcyclobutene groups is flexible in how the reaction is accomplished. Advantageously, the bulk polymer is dissolved or slurried in a suitable solvent with an effective amount of an arylcyclobutene alkylating or acylating agent and the reaction is heated in the presence of a suitable acidic catalyst. An effective amount of alkylating or acylating agent is meant to be that amount of the alkylating or acylating agent necessary to produce a detectable change in the engineering thermoplastic after the reaction has been completed. In this way, the arylcyclobutene group can be attached to the aromatic moieties of the polyaryl thermoplastic. The pendant arylcyclobutene groups impart to the final product the curing or crosslinking advantages mentioned above.

Among the solvents which may be employed as inert liquid reaction media are those which are advantageously solvents for the polyaryl thermoplastic and for the arylcyclobutane alkylating or acylating agent. It is not a requirement that the thermoplastic employed in the invention dissolve in the reaction solvent and the reaction may be accomplished in a slurry of the thermoplastic and a suitable solvent. It is required to use a solvent that will dissolve the arycylcobutene alkylating or acylating agent. In a preferred embodiment, a solvent is employed that will advantageously dissolve both the polyaryl thermoplastic and the arylcyclobutene alkylating or acylating agent. Such solvents may include, but are not limited to, for example, methylene chloride, 1,2-dichloroethane, carbon tetrachloride, benzene, dichlorobenzene, nitromethane and nitroalkanes, nitrobenzene, and ethers. Mixtures of such solvents may also be used. A preferred solvent is 1,2-dichloromethane.

The Lewis acid catalyst used in the invention can be any one of those which is normally designated a Friedel-Crafts catalyst. Among such catalysts may be mentioned, but not limited to, zinc chloride, ferric chloride, aluminum chloride, boron trifluoride, boton trifluoride-etherate complex, stannic chloride, antimony pentachloride, uranium tetrachloride, sulfuric acid, phosphoric acid, silver tetrafluoroborate, silver perchlorate, and toluenesulfonic acid. A preferred Lewis acid catalyst is zinc chloride. When the catalyst is in the form of gas, such as boron trifluoride, the latter can easily be passed through the solution of the aromatic polymer and arylcyclobutene alkylating or acylating agent.

Other examples of Lewis acid catalysts useful in the process of the invention are beryllium chloride, cadmium chloride, boron trichloride, boron tribromide, gallium trichloride, gallium tribromide, titanium tetrachloride, titanium tetrabromide, zirconium tetrachloride, stannic bromide, antimony trichloride, bismuth trichloride, perchloric acid, chlorosulfonic acid, fluorosulfonic acid, alkylsulfonic acids, arylsulfonic acids, trifluoroacetic acid, silver hexafluoroantimonate, silver hexafluorophosphate, silver hexafluoroarsenate, and silver phosphate. Solid acid catalysts such as cationic exchange resins, acidic zeolites aluminates, silicates and aluminosilicates are also useful as Lewis acid catalysts as are metal alkyls and metal alkoxides, for example, aluminum alkyls, boron alkyls, and aluminum alkoxides.

The Lewis acid catalyst (advantageously a Friedel-Crafts catalyst) can be employed in an amount which is effective to establish the modification in and attachment of the arylcyclobutene group to the aromatic moiety of the polyaryl engineering thermoplastic. Generally, one can employ amounts ranging from about 0.001 to about 10% by weight of the acidic catalyst based on the weight of the thermoplastic. Obviously, since the amount is not critical, larger or smaller amounts of the acidic catalyst may be employed depending on whether it is a solid, liquid or gas, depending on the particular polyaryl thermoplastic employed, the particular arycyclobutene alkylating or acylating agent used, the reaction temperature, etc.

The temperature at which the reaction proceeds between the arycyclobutene alkylating or acylating agent and the polyaryl thermoplastic can be varied. Generally, depending on the thermoplastic used, the particular acidic catalyst, the concentration of the catalyst, etc., temperatures may range from about $-10°$ to about 150° C. Temperatures above 100° C. are generally not required. Preferably, temperatures from about 25° to about 100° C. are adequate. It will be understood that where substituted arylcyclobutene alkylating or acylating agents are used, temperatures should be kept low in order to avoid premature thermal opening of the cyclobutene ring and subsequent curing of the agent or the polyaryl thermoplastic modified with the agent. Atmospheric pressures are usually adequate, although superatmospheric or subatmospheric pressures are not precluded.

Reaction times will vary depending upon such factors as the temperature employed, degree of agitation, the type of arylcyclobutene alkylating or acylating agent used, the nature of the polyaryl thermoplastic as well as the degree of arylcyclobutene alkylation or acylation desired in the final product. Periods ranging from about 1 hour or less to as many as 48 hours or more will, therefore, not be unusual. Under most circumstances, effective results can be achieved for times ranging from about 1 to 24 hours to provide for at least 5 mol percent of arylcyclobutene substitution, based on the total mols of repeating aromatic units in the polymer.

During the arylcyclobutene alkylation or acylation of the polyaryl thermoplastic, substantially anhydrous conditions are preferably maintained in order to provide optimum results. Recovery of the final arylcyclobutene alkylated or acylated thermoplastic can be achieved by the use of a low molecular weight aliphatic alcohol into which the reaction mixture can be poured to provide separation of the final product. The alkylated or acylated thermoplastic can then be recovered by filtration or other means commonly used in the art followed by standard drying techniques.

It should be noted that in any polymer chain each aromatic moiety may not have an arylcyclobutene group attached. A significant aspect of the present invention is that the end product contains randomly distributed arylcyclobutene structures along the polymer chain. It may be that there is one arylcyclobutene group attached to every 5 to 10 aromatic moieties in the thermoplastic chain. By the same token, there may also be more than one arylcyclobutene group attached to the same aromatic moiety.

Accordingly, when such a thermoplastic is molded at temperatures above about 200° C. (or otherwise heated above such temperatures), increase in molecular weight or crosslinking occurs. The claimed crosslinking is believed to proceed by the thermal ring opening of the arylcyclobutenes to o-quinodimethane structures which then homopolymerize or dimerize to give a crosslinked product. The cured products in general exhibit improved Tg and increased solvent resistance over similar cured thermoplastics without pendant arycyclobutene groups.

The arylcyclobutene substituted polyaryl thermoplastics provided by the present invention can be employed in a variety of applications depending upon such factors as the type of polyaryl thermoplastic used and the degree of arylcyclobutene substitution in the polymer. These materials can provide for solvent resistant coating compounds and molding compounds, high temperature and oxidatively stable fibers and films, etc.

The polyaryl thermoplastics of the instant invention may be compounded with other polymers, oils, fillers, reinforcements, antioxidants, stabilizers, fire retardants, antiblocking agents and other plastic compounding ingredients without departing from the scope of this invention.

To illustrate the instant invention, the following examples are given. It is to be understood, however, that the examples are given for the purpose of illustration only and the invention is not to be regarded as limited to any of the specific materials or conditions used in the specific examples.

EXAMPLE 1

A key aspect of the present invention deals with the ring opening of the arylcyclobutene groups to give reactive o-quinodimethane structures. In this example, half-life values for a particular arylcyclobutene, benzocyclobutene, are calculated and summarized in the following Table 1, based on values reported in W. R. Roth et al Chem. Ber., 1978, 111, 3892–3903. The results suggest that reactive oligomers and polymers containing benzocyclobutenes which are not substituted at the cyclobutene ring would have long shelf-life and good reactivity at >200° C.

TABLE 1

Benzocyclobutene $\xrightarrow{k}$ o-quinodimethane

| T (°C.) | k (sec$^{-1}$) | t$_{\frac{1}{2}}$ (hr) |
|---|---|---|
| 25 | 2.5 × 10$^{15}$ | 7.6 × 10$^{10}$ |
| 100 | 1.7 × 10$^{-9}$ | 1.1 × 10$^{5}$ |
| 150 | 9.6 × 10$^{-7}$ | 2 × 10$^{2}$ |
| 200 | 1.4 × 10$^{-3}$ | 1.4 |
| 250 | 7.8 × 10$^{-3}$ | 2.5 × 10$^{-2}$ |

EXAMPLE 2

Preparation of 4-Chloromethylbenzocyclobutene 4-chloromethylbenzocyclobutene was prepared from p-methyl benzyl chloride in two steps according to the procedure reported by G. W. Ewing and V. Boekelheide in *J. Chem. Soc. Chem. Commun.*, 1979, 207. The p-methyl benzyl chloride was first alkylated with paraformaldehyde in the presence of ZnCl$_2$ and a catalytic amount of HCl to give 2,4-bis(chloromethyl)toluene. Subsequent ring closure, with the elimination of HCl, to form the benzocyclobutene was performed by vacuum pyrolysis at 700° C. and <1 torr to give 4-chloromethylbenzocyclobutene.

Preparation of 4-chloromethylbenzocyclobutene may also be effected by a similar procedure beginning with o-methyl benzyl chloride, however, the procedure yields about a 1:2 mixture of 3-chloromethylbenzocyclobutene and 4-chloromethylbenzocyclobutene.

EXAMPLE 3

Preparation of a Polyethersulfone having Benzocyclobutene Groups Pendant to the Aromatic Rings of the Polymer Backbone A polysulfone containing substituted phenylmethyl benzocyclobutene groups was prepared by the alkylation of a commercial polysulfone, UDEL, with 4-chloromethylbenzocyclobutene. The alkylation was performed by dissolving the UDEL polysulfone in 1,2-dichloroethane, mixing in the 4-chloromethylbenzocyclobutene alkylating agent at 10 mole % based on the number of moles of repeating units of the polysulfone, adding a catalytic amount of ZnCl$_2$, and heating at 83° C. The modified polysulfone was isolated by precipitation from methanol. The incorporation of about 5%m of benzocyclobutene was confirmed by the characteristic $^{13}$C NMR resonance at δ29.2 ppm as well as the $^1$H NMR resonances of the substituted phenylmethyl benzocyclobutenes at δ3.0 and 3.78 ppm.

EXAMPLE 4

Curing of the Product Polymer

The modified polyethersulfone containing substituted phenylmethyl benzocyclobutenes, prepared in Example 3, was molded to crosslink the polymer and prepare films for comparison testing. The modified polysulfone was compression molded at 250° C. for five minutes to cure the polymer and resulted in clear, but slightly yellow films. Films of unmodified UDEL were prepared in the same manner. The UDEL films, by comparison to the films prepared from the modified polyethersulfone containing pendant benzocyclobutene groups were colorless. The films prepared from the modified polyethersulfone containing pendant benzocyclobutene groups were insoluble in dichloromethane while the UDEL films readily dissolved in dichloromethane.

The effect of crosslinking on Tg for the modified polysulfones was determined from a plot of the modulus vs. temperature for the separate films. The crosslinked polysulfone exhibited a 17° C. higher Tg than UDEL and an average DP between pendant benzocyclobutenes of 20. The 17° C. increase in Tg upon curing in the present system is more than twice that observed for ethynylmodified UDEL with approximately the same concentration of pendent reactive groups as reported in *J. Polym. Sci. Polym. Chem. Ed.* 1985, 23, 2233–46. Comparative Tg values (difference in Tg between crosslinked and unmodified UDEL) are given in Table 2.

TABLE 2

| Effect of Crosslinking on the Tg of UDEL | | |
|---|---|---|
| Pendant Reactive Group | M$_n$ Between Reactive Groups | Δ Tg (°C.) |
| Ethynyl[a] | 2898 | 20 |
| Ethynyl[a] | 9138 | 7 |

TABLE 2-continued

Effect of Crosslinking on the Tg of UDEL

| Pendant Reactive Group | $M_n$ Between Reactive Groups | Δ Tg (°C.) |
|---|---|---|
| Benzocyclobutene | 8957 | 17 |

"Values taken from J. Polym. Sci. Polym. Chem. Ed., 1985, 23, 2233–46.

EXAMPLE 5

Preparation of a Polyarylester Containing Pendant Benzocyclobutenes

A mixture of 10 grams of a commercial polyarylester, ARDEL, available from Amoco, 1 gram of 4-chloromethylbenzocyclobutene, 0.1 gram of zinc chloride, and 100 mls of 1,2-dichloroethane was heated at reflux for 24 h. The modified polyarylester was isolated by precipitation from methanol. The presence of pendant benzocyclobutene groups was confirmed by the $^1$H NMR resonance at δ3.09 ppm. Crosslinking of the modified ARDEL was effected by compression molding at 250° C. for 10 minutes to give a clear slightly yellow film which was insoluble in 1,2-dichloroethane. An unmodified ARDEL film prepared in the same manner dissolved completely in 1,2-dichloroethane within 30 minutes.

EXAMPLE 6

Preparation of a Polycarbonate Containing Pendant Benzocyclobutenes

A mixture of 10 grams of a commercial polycarbonate, MERLON, available from Mobay, 1 gram of 4-chloromethylbenzocyclobutene, 0.1 gram of zinc chloride, and 100 mls of 1,2-dichloroethane was heated at reflux for 24 h. The resulting green solution was poured into a Waring blender containing methanol to give 10.5 grams of a white fluffy powder after drying. The presence of pendant benzocyclobutene groups was confirmed by the $^1$H NMR resonance at δ3.08 ppm. Compression molding at 250° C. gave a film which swelled but did not dissolve in 1,2-dichloroethane. An unmodified MERLON film prepared in the same manner dissolved completely in 1,2-dichloroethane.

What is claimed is:

1. A polymeric composition which comprises a polyaryl having one or more arylcyclobutene groups pendant to an aromatic ring of said polyaryl, the polyaryl being selected from the group consisting of poly(aryl ether ketones), poly(aryl ether sulfones), poly(aryl ethers), poly(phenylene oxides), polyarylenes, polyphenylenes, polyxylylenes, polyarylacetylenes, poly(aryl sulfides), poly(aryl esters), poly(aryl carbonates) and poly(aryl amides), poly(aryl ester carbonates), poly(aryl amide imides), poly(aryl ether imides), and poly(aryl ether sulfone imides).

2. The composition of claim 1 wherein the polyaryl is a polyethersulfone.

3. The composition of claim 1 wherein the polyaryl is a poly(aryl ester).

4. The composition of claim 1 wherein the polyaryl is a poly(aryl carbonate).

5. The composition of claim 1 wherein the arylcyclobutene is 4-methylenebenzocyclobutene.

6. The composition of claim 1 wherein the arylcyclobutene is present in an amount from about 1 to about 15 mole % based upon the number of repeating units of the polymeric composition that contain at least one aromatic group capable of being alkylated or acylated under the reaction conditions.

7. A process for preparing a polyaryl engineering thermoplastic having arylcyclobutene groups pendant to an aromatic ring of the thermoplastic which comprises reacting a polymer selected from the group consisting of poly(aryl ether ketones), poly(aryl ether sulfones), poly(aryl ethers), poly(phenylene oxides), polyarylenes, polyphenylenes, polyxylylenes, polyarylacetylenes, poly(aryl sulfides), poly(aryl esters), poly(aryl carbonates), poly(aryl amides), poly(aryl ester carbonates), poly(aryl amide imides), poly(aryl ether imides), and poly(aryl ether sulfone imides)
in a suitable inert liquid reaction medium,
with an effective amount of an arylcyclobutene alkylating or acylating agent of the formula:

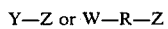

Y—Z or W—R—Z wherein Y is selected from the group consisting of CN, $H_2C=C(H)$, $CO_2R'$, $R'CO_2$, CHO, $COR'$, $CO_2OCR'$, $CO_2H$, and COX, wherein W is selected from the group consisting of a halogen, OH, SCN, SCl, CN, $H_2C=C(H)$, $CO_2R'$, $R'CO_2$, CHO, $COR'$, $CO_2OCR'$, $CO_2H$, and COX, wherein X is a halogen and R' is an hydrocarbyl group, wherein R is a hydrocarbylene group and R contains an alkylene group bonded to W when W is a halogen, OH, SCN or SCl, wherein Z is an arylcyclobutene group and Y and R are bonded to the aryl group of Z, and with a catalytic amount of a Lewis acid catalyst, and heating the reaction medium at a temperature below the temperature at which the arylcyclobutene alkylating or acylating agent undergoes polymerization or dimerization.

8. The process of claim 7 wherein the Lewis acid catalyst is selected from the group consisting of $ZnCl_2$, $FeCl_3$, $AlCl_3$, $BF_3$, $BF_3$-etherate complex, $SnCl_4$, $SbCl_5$, $UCl_4$, $H_2SO_4$, $H_3PO_4$, toluenesulfonic acid, $AgBF_4$, and $AgClO_4$.

9. The process of claim 7 wherein the halogen is chlorine and R is $CH_2$.

10. The process of claim 7 wherein the arylcyclobutene group Z is selected from the group consisting of benzocyclobutene, 1-cyanobenzocyclobutene, 2,3-naphthocyclobutene, and 1,2-naphthocyclobutene.

11. The process of claim 7 wherein the arylcyclobutene is 4-chloromethylbenzocyclobutene.

12. The process of claim 11 wherein the polymer is a poly(aryl ether sulfone).

13. The process of claim 11 wherein the polymer is a poly(aryl ester).

14. The process of claim 11 wherein the polymer is a poly(aryl carbonate).

15. The process of claim 11 wherein the inert liquid reaction medium is 1,2-dichloroethane.

16. The process of claim 11 wherein the Lewis acid catalyst is $ZnCl_2$.

17. The process of claim 11 wherein the arylcyclobutene is present in an amount from about 1 to about 15 mole % based upon the number of repeating units of the polymer that contain at least one aromatic group capable of being alkylated or acylated under the reaction conditions.

18. A cured composition obtained by heating the polymeric composition of claim 1 to a temperature at which arylcyclobutenes undergo polymerization or dimerization to obtain the desired crosslinking.

19. A cured composition obtained by heating the polymeric composition of claim 1 to a temperature at least about 200° C. to obtain the desired crosslinking.

* * * * *